United States Patent [19]

Kempf

[11] Patent Number: 4,738,140
[45] Date of Patent: Apr. 19, 1988

[54] APPARATUS FOR PERFORMING PRESSURE, NORMAL FORCE AND BENDING MEASUREMENTS ON PIPELINES

[75] Inventor: Burkhard Kempf, Mömbris, Fed. Rep. of Germany

[73] Assignee: Kraftwerk Union Aktiengesellschaft, Mülheim, Fed. Rep. of Germany

[21] Appl. No.: 890,125

[22] Filed: Jul. 24, 1986

[30] Foreign Application Priority Data

Jul. 25, 1985 [DE] Fed. Rep. of Germany ....... 3526663

[51] Int. Cl.⁴ .......................... G01L 7/04; G01L 9/04
[52] U.S. Cl. ......................... 73/730; 73/753; 73/862.04
[58] Field of Search ............ 73/730, 714, 862.04, 73/862.54, 862.63, 753, 726, 727

[56] References Cited

U.S. PATENT DOCUMENTS

| | | | |
|---|---|---|---|
| 2,420,148 | 5/1947 | Ostergren | 73/730 |
| 2,466,034 | 4/1949 | Mathews | 73/862.63 |
| 4,341,122 | 7/1982 | Lechler | 73/862.54 |
| 4,420,980 | 12/1983 | Dunemann et al. | 73/730 |
| 4,500,864 | 2/1985 | Nakane et al. | 338/4 |

FOREIGN PATENT DOCUMENTS

| | | |
|---|---|---|
| 0042371 | 8/1981 | European Pat. Off. |
| 0049501 | 4/1982 | European Pat. Off. |
| 3406059 | 2/1985 | Fed. Rep. of Germany |
| 2215615 | 8/1974 | France |

*Primary Examiner*—Donald O. Woodiel
*Attorney, Agent, or Firm*—Herbert L. Lerner; Laurence A. Greenberg

[57] ABSTRACT

An apparatus for measuring pressure, normal force and flexure in a cylindrical body includes first wire strain gauges disposed along a pipe in axial direction, second wire strain gauges disposed along the pipe in tangential direction, and an evaluating unit having inputs connected to the wire strain gauges and outputs issuing separate values for pressure, normal force and bending of the pipe.

4 Claims, 1 Drawing Sheet

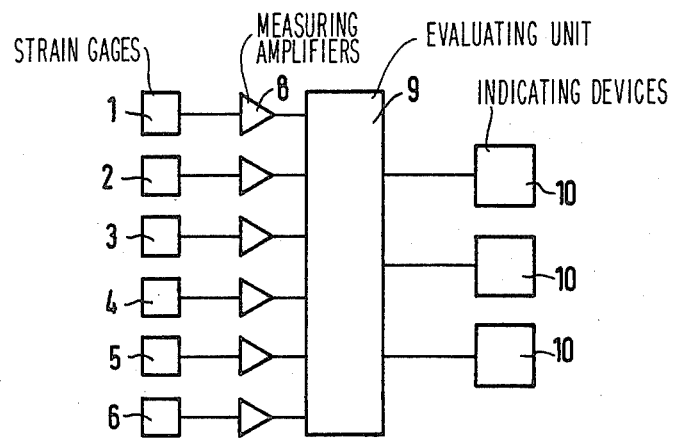
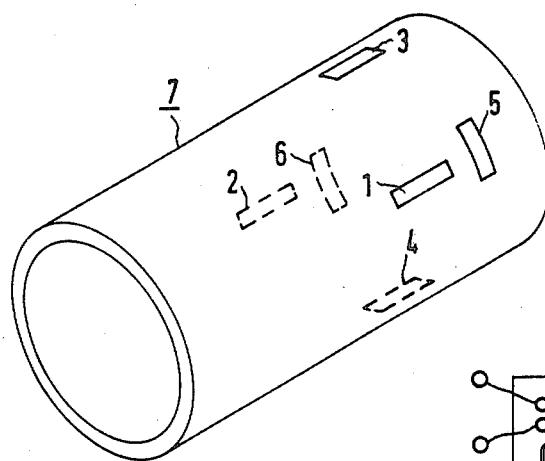
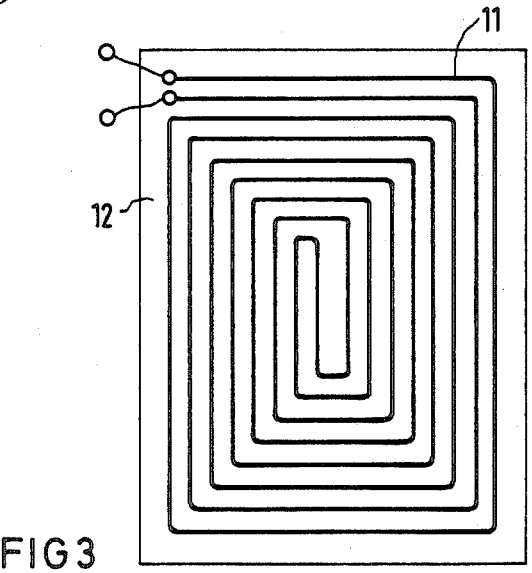

APPARATUS FOR PERFORMING PRESSURE, NORMAL FORCE AND BENDING MEASUREMENTS ON PIPELINES

The invention relates to an apparatus for measuring pressure, normal force and bending in a cylindrical body, especially a pipe.

Such an apparatus is known from European Patent No. 00 42 371. In that device, a hollow body, especially a pipe, is enclosed by a two-part measuring pickup which measures pipe deformations due to internal pressure.

However, circumferential expansion of the wall of a pipe is not caused exclusively by the internal pressure. External mechanical stresses of the hollow body also cause deformation which are superimposed on the deformations due to internal pressure. Depending on the magnitude of the superimposed deformation, a determination of the internal pressure from the total deformation is impossible, or can only be carried out with a large error.

It is accordingly an object of the invention to provide an apparatus for performing pressure, normal force and bending measurements on pipelines, which overcomes the heretoforementioned disadvantages of the heretofore-known devices of this general type, and is not disturbed by other stresses which are superimposed on the pressure.

With the foregoing and other objects in view there is provided, in accordance with the invention, an apparatus for measuring pressure, normal force and flexure in a cylindrical body, especially a pipe, comprising first strain gages disposed along a pipe in axial direction, second strain gages disposed along the pipe in tangential direction, and an evaluating unit having inputs connected to the strain gages and outputs issuing separate values for pressure, normal force and bending of the pipe.

The signals from the strain gages are amplified by conventional measuring amplifiers and are fed to the evaluating unit which subdivides the elongation signals into portions which are independent of each other and are proportional to pressure, normal force and flexure load variables based on the laws relating to the material. If the geometric dimensions and the material characteristics, such as modulus of elasticity and transverse contraction or Poisson's ratio, are also taken into consideration, the desired values are picked up directly at the output of the evaluating unit.

In the apparatus according to the invention, conventional strain gages are disposed on opposite sides of the pipe in tangential and axial orientation.

In accordance with another feature of the invention, the first strain gages are in the form of four strain gages disposed along the longitudinal direction of the pipe and mutually distributed at 90° spacings in the circumferential direction of a cross section of the pipe, and the second strain gages are in the form of two strain gages diametrically opposite each other in the circumferential direction of the pipe in the vicinity of two of the first strain gages. In this way, the effects of the pressure forces on the disposition of the strain gages differ from the effects of the bending stresses.

An advantage of the apparatus according to the invention is that the pressure, normal force and bending of a pipe are indicated separately and without changing the function and integrity of the pipe by using drill holes, pressure measuring nozzles or the like. Only gages available on the market are used for the strain gauges.

In accordance with a further feature of the invention, each of the strain gages includes elongation conductor runs of different lengths and resistance tangentially and axially disposed in series within a measuring grid on the pipe, the ratio of axial and tangential resistance of the conducting runs corresponding to the ratio of the number one to the transverse contraction ratio of the pipe.

The signal delivered by such a measuring grid of strain gages is only directly proportional to the pressure. Since the influences of the other stresses are already eliminated, an expensive evaluating unit is eliminated.

In accordance with a concomitant feature of the invention, the elongation conductor runs of each of the strain gages are disposed in the form of a double spiral. An advantage of this double spiral is that for measuring axial and tangential elongations only small area is needed.

A particular advantage of the invention is that a complex material stress can be separated into individual types of stress by means of a single evaluating unit. In addition, no changes to the pipe are necessary, such as is required, for instance, in the case of pressure measuring nozzles.

Other features which are considered as characteristic for the invention are set forth in the appended claims.

Although the invention is illustrated and described herein as embodied in an apparatus for performing pressure, normal force and bending measurements on pipelines, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

FIG. 1 is a schematic circuit diagram of an apparatus according to the invention;

FIG. 2 is a diagrammatic, perspective view of a pipe, on the surface of which strain gages of the apparatus according to the invention are disposed; and FIG. 3 is an elevational view of a double spiral of strain gages for the pressure measurement.

Referring now to the figures of the drawings in detail and first, particularly, to FIG. 2 thereof, there is seen a pipe 7 with strain gages 1 to 6 on the surface of the pipe for measuring deformation of the pipe. Four strain gages 1 to 4 are disposed along the longitudinal direction of the pipe 7 and are distributed about the periphery thereof at a mutual spacing of 90°. The gages 1–4 deliver a signal in the event of a axial elongation of the pipe 7. The other two strain gages 5 and 6 are disposed opposite each other in the circumferential direction of the pipe, in the vicinity of the wire strain gauges 1 and 2.

The gauges 5 and 6 deliver a signal in the event of tangential elongation of the pipe 7.

According to FIG. 1, the strain gages 1 to 6 are connected through measuring amplifiers 8 to an evaluating unit 9. Outputs of the evaluating unit 9 are connected to indicating devices 10 or recording devices, to which the values of the pressure, the normal force and the flexure at the pipe 7 are fed.

According to FIG. 3, a strain gage 11 is formed of elongation or stretching conductor runs of different lengths which alternatingly extend axially and tangentially on the pipe 7 and are interconnected in series. With this construction, the sum of the axial components relates to the sum of the tangential components like the number one relates to the transverse contraction ratio of the pipe 7. The strain gage 11 may, for instance, have the shape of a double spiral which is disposed on a carrier foil 12 on the pipe surface.

If the sensitivity of the strain gage 11 as well as the material characteristics and the pipe dimensions are known, the pressure, normal force or normal force component and flexure are determined by the apparatus according to the invention. Calibration is not necessary but increases the accuracy.

The sum of the tangential elongation or stretching conductor runs 11 relates to the sum of the axial elongation or stretching conductor runs 11 like the number one relates to the transverse contraction ratio. A signal which is proportional to the pressure in the pipe 7 is therefore present at the output of the double spiral. Since materials with a transverse contraction ratio of 0.3 are used for most pipelines, for instance, a 120 ohm strain gage is subdivided in such a way that elongation or stretching conductor runs with 92.3 ohms are disposed at the pipe 7 in the tangential direction and conductor runs with 27.7 ohms in the axial direction. The output signal at the strain gage 11 is therefore proportional to the pressure in the interior of the pipe 7.

The foregoing is a description corresponding in substance to German Application No. P 35 26 663.5, dated July 25, 1985, the International priority of which is being claimed for the instant application, and which is hereby made part of this application. Any material discrepancies between the foregoing specification and the aforementioned corresponding German application are to be resolved in favor of the latter.

We claim:

1. Apparatus for measuring pressure, normal force and flexure in a cylindrical body, comprising first strain gages disposed along a pipe in axial direction, second strain gages disposed along the pipe in tangential direction, and an evaluating unit having inputs connected to said strain gauges and outputs issuing separate values for pressure, normal force and bending of the pipe.

2. Apparatus according to claim 1, wherein said first strain gages are in the form of four strain gages disposed along the longitudinal direction of the pipe and mutually distributed at 90° spacings in the circumferential direction of a cross section of the pipe, and said second strain gages are in the form of two strain gages diametrically opposite each other in the circumferential direction of the pipe in the vicinity of two of said first strain gages.

3. Apparatus according to claim 1, wherein each of said strain gages includes elongation conductor runs of different lengths tangentially and axially disposed in series within a measuring grid on the pipe, the ratio of axial and tangential resistance of said conducting runs corresponding to the ratio of the number one to the transverse contraction ratio of the pipe.

4. Apparatus according to claim 3, wherein said elongation conductor runs of each of said strain gage are disposed in the form of a double spiral.

* * * * *